United States Patent [19]

Meunier et al.

[11] Patent Number: 5,016,122
[45] Date of Patent: May 14, 1991

[54] COIL SWITCHING DEVICE

[75] Inventors: Thierry Meunier, Obereschach, Fed. Rep. of Germany; Jean L. Jaffard, Saint Egreve, France

[73] Assignee: SGS-Thomson Microelectronics S.A., Gentilly, France

[21] Appl. No.: 323,905

[22] Filed: Mar. 15, 1989

[30] Foreign Application Priority Data

Mar. 18, 1988 [FR] France ................. 88 03899

[51] Int. Cl.$^5$ ........................................... G11B 15/087
[52] U.S. Cl. ...................................... 360/62; 360/67; 360/68
[58] Field of Search .................. 360/62, 67, 68, 61

[56] References Cited

U.S. PATENT DOCUMENTS

| | | |
|---|---|---|
| 3,824,623 | 12/1972 | Gucker . |
| 3,869,717 | 2/1974 | Kawada et al. . |
| 4,044,387 | 9/1975 | Watkins et al. . |
| 4,198,664 | 3/1978 | Yasunaga et al. . |
| 4,605,974 | 8/1986 | Ochi et al. ............... 360/62 |
| 4,665,446 | 5/1987 | Takayama ............... 360/62 |

FOREIGN PATENT DOCUMENTS 0006142 1/1980 European Pat. Off. .
2141874 1/1973 France .

OTHER PUBLICATIONS

S. D. Keidl, "Multiple Head Read/Write and Head Select Circuit", IBM Technical Disclosure Bulletin, vol. 17, No. 8 (Jan. 1975), pp. 2415-2417.

Primary Examiner—Aristotelis M. Psitos
Assistant Examiner—Varsha V. Sheladia
Attorney, Agent, or Firm—Lowe, Price, LeBlanc, Becker & Shur

[57] ABSTRACT

A device for switching a coil between a first state where it is connected between a supply source and the ground through an impedance and a second state where it is connected between an output terminal and the ground, a first switch ($T_{REC}$) being arranged between the output terminal and the supply source. This switching device comprises: a diode (14) connected between the output terminal (16) and the supply source, a controlled switch ($T_{PB}$) connected in parallel with the impedance between a second terminal of the coil and the ground, and a detection and control means (20, 24) connected between the diode and the power supply source for detecting the time when the voltage between the diode and the ground becomes equal to a predetermined value lower than the forward voltage drop across the diode and for thereby controlling said switch.

17 Claims, 1 Drawing Sheet

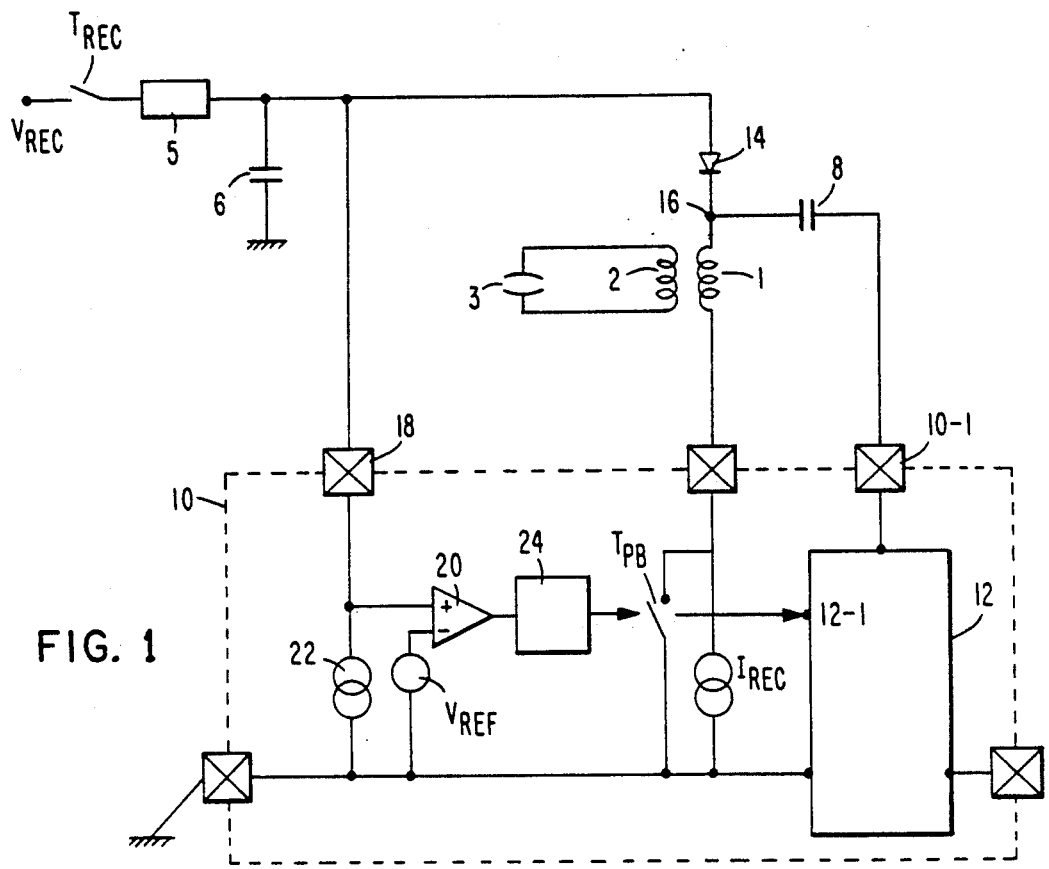
FIG. 1
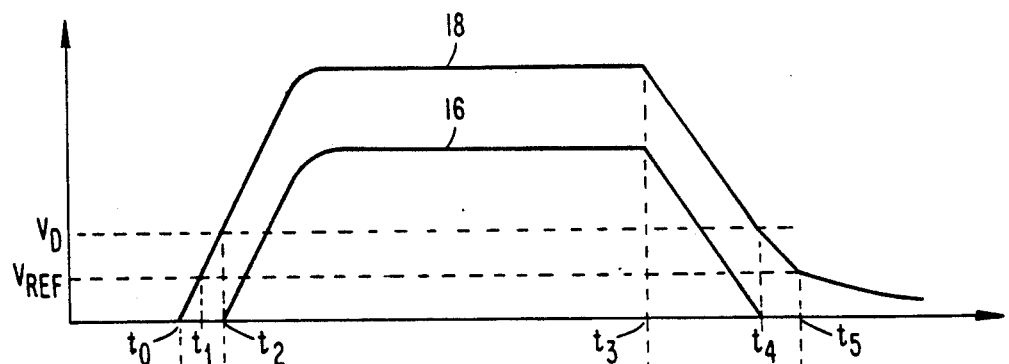
FIG. 2A
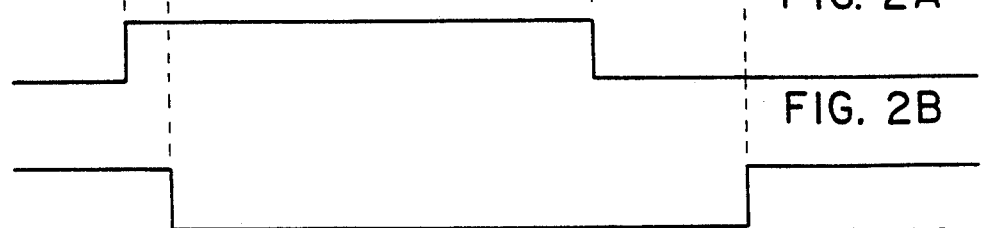
FIG. 2B
FIG. 2C

COIL SWITCHING DEVICE

BACKGROUND OF THE INVENTION

The instant invention relates to a device for switching a coil between a state where it is fed and a state where it is used as a receiver. Thus, the instant invention aims more particularly at the switching of a coil used in relation with a videotape recorder magnetic head liable to serve as a read/write head.

In the read state, one of the terminals of the coil is grounded and the voltage on the other terminal is detected. In the write state, the terminal which was grounded is connected to a current source and the other terminal is connected to a power supply voltage, means being provided for modulating the current source and letting a current flow in the coil as a function of the signal to be recorded.

When it is desired to switch from a state to another, it is essential to avoid that a voltage be impressed to the coil when its other terminal is directly grounded and conversely that this other terminal be connected to the ground when a voltage is being impressed onto the coil. Indeed, overcurrents might occur as well as overvoltages impairing the operation and the lifetime of the device.

In the prior art, in order to resolve this problem, one has generally made use of devices, difficult to integrate, and comprising a high number of switches, the operation of which is to be precisely synchronized by means of complex processes.

One object of the instant invention is to provide for such a switching device which is particularly simple, comprises few switches, and is easily integrable.

SUMMARY OF THE INVENTION

In order to achieve this purpose, the instant invention provides a device for switching a coil between a first state where it is connected between a power supply source and the ground through an impedance, and a second state where it is connected between an output terminal and the ground, a first switch being arranged between the output terminal and the supply source. This switching device comprises a diode connected between the output terminal and the supply source a controlled switch connected in parallel on the impedance between a second coil terminal and the ground ; and a detection and control means connected between the diode and the supply source for detecting the time when the voltage between the diode and the ground becomes equal to a predetermined value, lower than the forward voltage drop across the diode, and for thereby controlling said switch.

According to an embodiment of the instant invention, the detection and control means comprises a comparator comparing the power supply voltage with a predetermined voltage lower than the forward voltage drop across the diode.

According to an embodiment of the instant invention, the supply source is connected to the diode through a time constant circuit, the first switch being arranged between the power supply source and this time constant circuit.

According to an embodiment of the instant invention, it comprises means for discharging the time constant circuit, once the first switch has been switched off and the voltage has reached the threshold voltage of the diode.

A specific advantage resulting from the simplicity and the possibility of integrating the circuit is obtained in case of an application to a video tape recorder wherein high frequencies are used and wherein an increase in the number of components and connections causes spurious reactances.

BRIEF DESCRIPTION OF THE DRAWINGS

Those objects, features, advantages and others of the instant invention will clearly appear from the following detailed description of preferred embodiments, in connection with the attached drawings, wherein:

FIG. 1 partially shows in the form of block diagrams an embodiment of the invention; and FIGS. 2A, 2B, 2C show time diagrams useful to understand the operation of the circuit of FIG. 1.

DETAILED DESCRIPTION OF THE DRAWINGS

In FIG. 1, the coil, the switching of which is to be controlled, is designated by reference 1. It is coupled with a coil in series with a read/write head of a video tape recorder 3.

In the write or recording mode, the coil 1 is connected in series with a power supply source $V_{REC}$ through a switch $T_{REC}$ and a time constant circuit comprising for example a series impedance 5 and a parallel capacitor 6. The other terminal of the coil 1 is grounded through a current source $I_{REC}$. This current source is for example a portion of an integrated circuit 10 comprising means, not shown, for ensuring the modulation of the current as a function of the signal to be recorded by the recording head 3.

In the read or reproducing mode, the lower terminal of the coil 1 is directly grounded through a switch $T_{PB}$ and the other terminal of the coil 1 is connected through a capacitor 8 to an input 10-1 of the integrated circuit 10 coupled with an amplifier 12 for supplying the read signal at the output terminal of the integrated circuit.

Thus, in the recording phase, the switch $T_{REC}$ is on and the switch $T_{PB}$ is off whereas, in the read phase, the switch $T_{REC}$ is off while the switch $T_{PB}$ is on.

According to the invention, only the switch $T_{REC}$ is handled from outside and the switch $T_{PB}$ is automatically controlled in order to avoid the switching on of this switch when a voltage is impressed onto the coil 1. For this purpose, the instant invention comprises a diode 14 connected between the upper terminal 16 of the coil 1 and the supply voltage, as represented. The second terminal of diode 14, not connected to the terminal 16, is also connected to an input pad 18 of the integrated circuit and from there to the non-inverting input terminal of a comparator 20. The pad 18 is also grounded through a current source 22. The inverting input terminal of comparator 20 is grounded through a power supply voltage $V_{REF}$. The output of comparator 20 is connected through an interface circuit 24, especially comprising flip-flops, at the control input of the switch $T_{PB}$ and possibly at other regions of the circuit, for example, as illustrated, at the input 12-1 of amplifier 12.

In FIG. 1, a square wherein a cross is drawn designates an input pad of the integrated circuit 10.

The operation of the circuit of FIG. 1 will be described in more detail in relation with FIGS. 2A, 2B and 2C ; FIG. 2A shows the d.c. voltage level at terminals 16 and 18, FIG. 2B shows the state of the switch $T_{REC}$ and FIG. 2C shows the state of the switch $T_{PB}$. In FIGS. 2B and 2C, the high level corresponds to the ON-state of a switch.

Let the initial state be the read state wherein switch $T_{REC}$ is off and switch $T_{PB}$ is on. If, at a time $t_0$, the switch $T_{REC}$ is switched on, the voltage will start increasing at terminal 18 while the capacitor 6 is charging. At the time $t_1$, when this voltage reaches the value $V_{REF}$ which is chosen lower than the forward voltage drop $V_D$ in the diode 14, the comparator 20 switches and the interface circuit 24 causes the switching off of the switch $T_{PB}$. It will be noted that this switching off occurs while there is no voltage on terminal 16, a voltage starts occurring at this terminal only once the voltage across the capacitor 6 has reached the value $V_D$, at the time $t_2$.

The recording mode is maintained until a time $t_3$ when the switch $T_{REC}$ is switched off. From that time $t_3$, the voltage across the capacitor 6 is linearly discharged by the action of the current source $I_{REC}$ until a time $t_4$ when the voltage on the terminal 18 has reached the forward voltage drop in diode 14. Then, the voltage on terminal 18 continues to decrease by the action of the current source 22 and, at a time $t_5$, when this voltage has reached the value $V_{REF}$, comparator 20 switches again for causing, through the interface circuit 24, the switching on of the switch $T_{PB}$.

It will be noted that the sequence of events implemented by the circuit according to the invention presents the advantage of being entirely self-acting from the time when the switch $T_{REC}$ is operated; the circuit "checks" if the voltage across the coil 1 is null before switching the switch $T_{PB}$. Thus, this circuit is particularly simple since only one switch is handled, the second switch being self-operated.

As described hereinabove, this circuit is liable to be essentially realized in the form of an integrated circuit and necessitates practically no external components such as switches or filters for supplying time delays. Moreover, owing to its simplicity, this circuit necessitates a small surface when implemented as an integrated circuit. On the other hand, as it is well known to generate a reference voltage $V_{REF}$ lower, in a determined way, than the forward conduction threshold voltage of a diode, this circuit exhibits a high reliability and does not require any external adjustment.

Of course, this circuit is liable of various variations and modifications which will clearly appear to those skilled in the art who will be able, especially, to realize various types of interface circuits and various types of switches, such as the switch $T_{PB}$ realized in the integrated circuits, for example in the form of bipolar transistors.

What is claimed is:

1. A device for switching a coil between (i) a first state wherein the coil is connected between a power supply source and a source of ground potential through a current source and (ii) a second state wherein said coil is connected between an output terminal and said source of ground potential, a first switch connected between said output terminal and said power supply source, said device comprising:
    a diode connected between said output terminal and said power supply source, said diode having a forward voltage drop;
    a controlled switch connected in parallel to said current source between a second terminal of said coil and said source of ground potential; and
    detection and control means connected between said diode and said power supply source for detecting when the voltage between said diode and said source of ground potential becomes equal to a predetermined value lower than the forward voltage drop across the diode and, in response, controlling said switch.

2. A switching device according to claim 1, wherein the detection and control means comprises a comparator comparing the power supply voltage with a predetermined voltage lower than the forward voltage drop of the diode.

3. A switching device according to claim 1, wherein the power supply source is connected to the diode through a time constant circuit, the first switch arranged between the supply source and said time constant circuit.

4. A switching circuit according to claim 3, further comprising means for discharging the time constant circuit one the first switch is switched off and once the voltage on said circuit reaches the threshold voltage of the diode.

5. A device for selectively operating a playback-/record head of a magnetic recorder in (i) a playback mode wherein the head is connected between a source of ground potential and an output terminal for receiving a signal generated by said head and (ii) a record mode wherein the head is connected between a power supply source and said source of ground potential through a current modulator, said switching device comprising:
    a diode having first and second terminals, said first terminal connected to said output terminal, said diode having a predetermined forward voltage drop;
    a first switch connected between said second terminal of said diode and said power supply source for connecting said output terminal to said power supply source through said diode when said head is operated in said record mode;
    voltage detector means connected to said second diode terminal for detecting a voltage between said diode and said source of ground potential equal to a predetermined value lower than the forward voltage drop across the diode and, in response, generating a mode control signal; and
    a second switch connected in parallel with said current modulator and responsive to said mode control signal for bypassing said current modulator thereby connecting said head to said source of ground potential when said voltage detected by said voltage detector is less than said predetermined value.

6. A device according to claim 5 wherein said current modulator comprises a current source.

7. A device according to claim 5 wherein said voltage detector comprises a comparator connected to compare said voltage at said second diode terminal with a predetermined reference voltage.

8. A device according to claim 7 wherein said predetermined voltage is less than said forward voltage drop of said diode.

9. A device according to claim 6 further comprising an RC circuit connected between said first switch and said second terminal of said diode.

10. A device according to claim 9 wherein said RC circuit comprises a resistor connected between said first switch and said second terminal of said diode and a capacitor connected between said second terminal of said diode and said source of ground potential.

11. A magnetic playback/recording device selectively operable in a playback mode for detecting magnetically recorded information on a magnetic medium and in a record mode for magnetically recording information onto said magnetic medium, comprising:

a power supply for supplying a power supply potential;

a source of a second potential lower than said power supply potential;

a magnetic playback/recording head having a first winding for (i) detecting magnetically recorded information on said magnetic medium and (ii) magnetically recording information onto said magnetic medium, and a second coil magnetically coupled to said first coil and including first and second terminals for supplying a playback signal from, and a recording signal to, said first coil;

a playback amplifier connected to said first terminal of said playback/recording head for supplying a playback output signal;

a diode having a first and second terminals, said first terminal of said diode connected to said first terminal of said magnetic playback/recording head and to said playback amplifier;

first switch means for selectively operating said magnetic playback/recording device in said playback mode and in said record mode, said first switch selectively supplying said power supply potential to said second terminal of said diode to operate said playback/recording device in said record mode;

voltage sensing means for detecting a predetermined potential at said second terminal of said diode and, in response, supplying a record mode control signal;

a modulator for controlling a current in response to externally applied information to be recorded by said magnetic playback/recording head onto said magnetic medium; and second switch means responsive to said record mode control signal for selectively connecting said second terminal of said second coil (i) to said modulator in response to said voltage means detecting said predetermined voltage and, otherwise, (ii) to said source of a second potential.

12. A magnetic playback/recording device according to claim 11 wherein said modulator comprises a current source.

13. A magnetic playback/recording device according to claim 11 wherein said voltage detector comprises a comparator connected to compare said voltage at said second diode terminal with a predetermined reference voltage.

14. A magnetic playback/recording device according to claim 13 wherein said predetermined voltage is less than said forward voltage drop of said diode.

15. A magnetic playback/recording device according to claim 11 further comprising an RC circuit connected between said first switch and said second terminal of said diode.

16. A magnetic playback/recording device according to claim 15 wherein said RC circuit comprises a resistor connected between said first switch and said second terminal of said diode and a capacitor connected between said second terminal of said diode and said source of said second potential.

17. A method of selectively operating a magnetic playback/recording device in a playback mode for detecting magnetically recorded information on a magnetic medium and in a record mode for magnetically recording information onto said magnetic medium, said playback/recording device including a magnetic playback/recording head having a first winding for detecting magnetically recorded information on said magnetic medium and for magnetically recording information onto said magnetic medium, and a second coil magnetically coupled to said first coil and including first and second terminals for supplying a playback signal from, and a recording signal to, said first coil, comprising the steps of:

selectively supplying a power supply potential to operate said magnetic recording device in said recording mode;

decreasing said power supply potential by a second potential to supply a record bias signal;

supplying said record bias signal to said playback/recording head;

detecting a level of said selectively supplied power supply potential and, in response, supplying a record control signal; and modulating said record bias signal with information to be recorded by said playback/recording head in response to said record control signal.

* * * * *